US012626917B2

(12) United States Patent
Maekawa et al.

(10) Patent No.: US 12,626,917 B2
(45) Date of Patent: May 12, 2026

(54) POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: SANYO Electric Co., Ltd., Kadoma (JP)

(72) Inventors: Masanori Maekawa, Osaka (JP); Takayuki Ishikawa, Osaka (JP); Kaoru Nagata, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 566 days.

(21) Appl. No.: 18/022,602

(22) PCT Filed: Aug. 26, 2021

(86) PCT No.: PCT/JP2021/031277
§ 371 (c)(1),
(2) Date: Feb. 22, 2023

(87) PCT Pub. No.: WO2022/050158
PCT Pub. Date: Mar. 10, 2022

(65) Prior Publication Data
US 2023/0317941 A1     Oct. 5, 2023

(30) Foreign Application Priority Data
Sep. 4, 2020     (JP) ................................. 2020-149324

(51) Int. Cl.
H01M 4/525 (2010.01)
C01G 53/42 (2025.01)
(Continued)

(52) U.S. Cl.
CPC ............ H01M 4/525 (2013.01); C01G 53/42 (2013.01); H01M 4/131 (2013.01); *C01P 2006/40* (2013.01); *H01M 2004/028* (2013.01)

(58) Field of Classification Search
CPC . H01M 4/525; H01M 4/131; H01M 2004/028
See application file for complete search history.

(56) References Cited

U.S. PATENT DOCUMENTS

2007/0248883 A1     10/2007   Oda et al.
2016/0248090 A1     8/2016   Maeda et al.
(Continued)

FOREIGN PATENT DOCUMENTS

JP     2001-085006     *   3/2001   .............. H01M 4/58
JP     2007-257985 A     10/2007
(Continued)

OTHER PUBLICATIONS

International Search Report dated Nov. 9, 2021, issued in counterpart International Application No. PCT/JP2021/031277 (2 pages).
(Continued)

*Primary Examiner* — Barbara L Gilliam
(74) *Attorney, Agent, or Firm* — WHDA, LLP

(57) ABSTRACT

A positive electrode active material for nonaqueous electrolyte secondary batteries according to one embodiment of the present disclosure contains a lithium transition metal composite oxide which is represented by general formula $Li_aNi_bCo_cAl_dX_eO_f$ (wherein $0.9 \leq a \leq 1.2$; $0.88 \leq b \leq 0.96$; $0 \leq c \leq 0.12$; $0 \leq d \leq 0.12$; $0 \leq e \leq 0.1$; $1.9 \leq f \leq 2.1$; $(b+c+d)=1$; and X represents at least one element that is selected from among Mn, Mg, Ca, Sr, Ba, Ti, Zr, V, Nb, Ta, Mo, W and B); and the lithium transition metal composite oxide has a pore volume of pores having a pore diameter of 0.3 μm or less of
(Continued)

from $6\times10^{-4}$ mL/g to $50\times10^{-4}$ mL/g, while having a particle fracture strength of 120 MPa or more at the volume average particle diameter.

7 Claims, 1 Drawing Sheet

(51) Int. Cl.
    *H01M 4/131*          (2010.01)
    *H01M 4/02*           (2006.01)

(56)                    References Cited

U.S. PATENT DOCUMENTS

| | | | |
|---|---|---|---|
| 2019/0044152 A1 | 2/2019 | Sakida et al. | |
| 2020/0168907 A1 | 5/2020 | Takijiri et al. | |
| 2020/0235376 A1* | 7/2020 | Hiratsuka ......... | H01M 10/0525 |
| 2020/0295365 A1 | 9/2020 | Saitou et al. | |

FOREIGN PATENT DOCUMENTS

| | | | |
|---|---|---|---|
| JP | 2016-157677 A | 9/2016 |
| WO | 2014/024571 A1 | 2/2014 |
| WO | 2017/169129 A1 | 10/2017 |
| WO | 2018/155121 A1 | 8/2018 |
| WO | 2019/026629 A1 | 2/2019 |

OTHER PUBLICATIONS

Extended (Supplementary) Eupopean search report dated Jan. 26, 2024 issued in counterpart application No. 21864216.3. (6 pages).

* cited by examiner

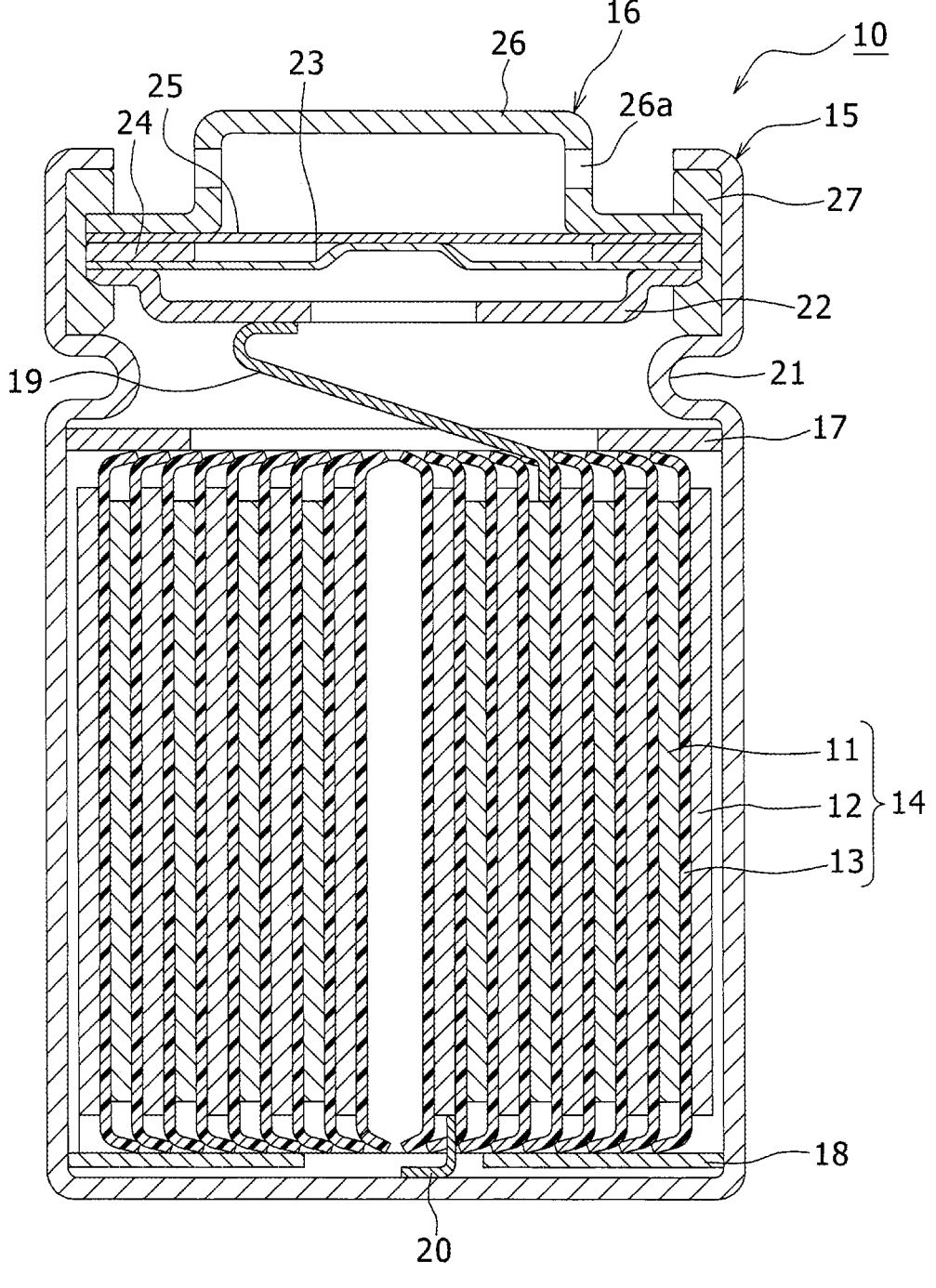

POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2021/031277 filed on Aug. 26, 2021 which claims the benefit of priority under 35 U.S.C. $119(a) of Japanese Patent Application No. 2020-149324 filed in Japan on Sep. 4, 2020, the contents of which are incorporated herein by reference.

TECHNICAL FIELD

The present disclosure relates to a positive electrode active material for a non-aqueous electrolyte secondary battery, and a non-aqueous electrolyte secondary battery.

BACKGROUND ART

For batteries with high capacity, a lithium nickelate-based positive electrode active material is widely used. Patent Literature 1 discloses art in which a lithium nickelate-based positive electrode active material having an average crushing strength (particle rupture strength) of greater than or equal to 15 and less than or equal to 100 MPa is used to regulate a contact area between an electrolyte liquid and the positive electrode active material within a certain range, thereby improving cycle characteristics and output characteristics of the battery.

CITATION LIST

Patent Literature

PATENT LITERATURE 1: Japanese Unexamined Patent Application Publication No. 2007-257985

SUMMARY

Technical Problem

In recent years, a Ni content in the lithium nickelate has been increased from the viewpoint of higher capacity. The present inventors' investigation has found that, in the lithium-nickelate system with high Ni content, even a positive electrode active material having the physical properties disclosed in Patent Literature 1 may deteriorate the battery capacity and the cycle characteristics. Patent Literature 1 still has a room for improvement in terms of achievement of both of the battery capacity and the cycle characteristics of the battery.

It is an advantage of the present disclosure to provide a positive electrode active material for a non-aqueous electrolyte secondary battery that contributes to achievement of both of the battery capacity and the cycle characteristics.

Solution to Problem

A positive electrode active material for a non-aqueous electrolyte secondary battery of an aspect of the present disclosure includes a lithium-transition metal composite oxide represented by the general formula $Li_aNi_bCo_cAl_dX_eO_f$, wherein $0.9 \leq a \leq 1.2$, $0.88 \leq b \leq 0.96$, $0 \leq c \leq 0.12$, $0 \leq d \leq 0.12$, $0 \leq e \leq 0.1$, $1.9 \leq f \leq 2.1$, $b+c+d=1$, and X represents at least one element selected from the group consisting of Mn, Mg, Ca, Sr, Ba, Ti, Zr, V, Nb, Ta, Mo, W, and B, wherein the lithium-transition metal composite oxide has a volume of pores having a pore diameter of less than or equal to 0.3 μm, of greater than or equal to $6 \times 10^{-4}$ and less than or equal to $50 \times 10^{-4}$ mL/g, and a particle rupture strength at an average volume particle diameter, of greater than or equal to 120 MPa.

A non-aqueous electrolyte secondary battery of an aspect of the present disclosure comprises: a positive electrode including the above positive electrode active material for a non-aqueous electrolyte secondary battery; a negative electrode; and a non-aqueous electrolyte.

Advantageous Effect of Invention

According to an aspect of the present disclosure, a secondary battery that achieves both of the battery capacity and the cycle characteristics may be obtained.

BRIEF DESCRIPTION OF DRAWING

FIG. 1 is a vertical sectional view of a cylindrical secondary battery of an example of an embodiment.

DESCRIPTION OF EMBODIMENTS

Hereinafter, an example of an embodiment of a non-aqueous electrolyte secondary batter according to the present disclosure will be described in detail. Hereinafter, a cylindrical battery housing a wound electrode assembly in a cylindrical exterior will be exemplified, but the electrode assembly is not limited to the wound electrode assembly, and may be a stacked electrode assembly in which a plurality of positive electrodes and a plurality of negative electrodes are alternately stacked one by one with a separator interposed therebetween. The shape of the exterior is not limited to the cylindrical shape, and may be, for example, a rectangular shape, a coin shape, or the like, and the exterior may be a pouch composed of laminated sheets including a metal layer and a resin layer.

FIG. 1 is a vertical sectional view of a cylindrical secondary battery 10 of an example of an embodiment. In the secondary battery 10 illustrated in FIG. 1, an electrode assembly 14 and a non-aqueous electrolyte (not illustrated) are housed in an exterior 15. The electrode assembly 14 has a wound structure in which a positive electrode 11 and a negative electrode 12 are wound with a separator 13 interposed therebetween. Hereinafter, for convenience of description, a sealing assembly 16 side will be described as the "upper side", and the bottom side of the exterior 15 will be described as the "lower side".

An opening end of the exterior 15 is capped with the sealing assembly 16 to seal inside the secondary battery 10. Insulating plates 17 and 18 are provided on the upper and lower sides of the electrode assembly 14, respectively. A positive electrode lead 19 extends upward through a through hole of the insulating plate 17, and is welded to the lower face of a filter 22, which is a bottom plate of the sealing assembly 16. In the secondary battery 10, a cap 26, which is a top plate of the sealing assembly 16 electrically connected to the filter 22, becomes a positive electrode terminal. On the other hand, a negative electrode lead 20 extends through a through hole of the insulating plate 18 toward the bottom side of the exterior 15, and is welded to a bottom inner face of the exterior 15. In the secondary battery 10, the exterior 15 becomes a negative electrode terminal. When the negative electrode lead 20 is provided on a terminal end part, the negative electrode lead 20 extends through an outside of the insulating plate 18 toward the bottom side of the exterior 15, and is welded to a bottom inner face of the exterior 15.

The exterior 15 is, for example, a bottomed cylindrical metallic exterior housing can. A gasket 27 is provided between the exterior 15 and the sealing assembly 16 to achieve sealability inside the secondary battery 10. The exterior 15 has a groove 21 formed by, for example, pressing the side wall thereof from the outside to support the sealing assembly 16. The groove 21 is preferably formed in a circular shape along a circumferential direction of the exterior 15, and supports the sealing assembly 16 with the gasket 27 interposed therebetween and with the upper face of the groove 21.

The sealing assembly 16 has the filter 22, a lower vent member 23, an insulating member 24, an upper vent member 25, and the cap 26 that are stacked in this order from the electrode assembly 14 side. Each member constituting the sealing assembly 16 has, for example, a disk shape or a ring shape, and each member except for the insulating member 24 is electrically connected each other. The lower vent member 23 and the upper vent member 25 are connected each other at each of centers thereof, and the insulating member 24 is interposed between each of the circumference of the vent members 23 and 25. If the internal pressure of the battery increases due to abnormal heat generation, for example, the lower vent member 23 breaks and thereby the upper vent member 25 expands toward the cap 26 side to be separated from the lower vent member 23, resulting in cutting off of an electrical connection between both members. If the internal pressure further increases, the upper vent member 25 breaks, and gas is discharged through an opening 26a of the cap 26.

Hereinafter, the positive electrode 11, negative electrode 12, separator 13, and non-aqueous electrolyte, which constitute the non-aqueous electrolyte secondary battery 10, particularly a positive electrode active material included in a positive electrode mixture layer constituting the positive electrode 11 will be described in detail.

[Positive Electrode]

The positive electrode has a positive electrode core and a positive electrode mixture layer formed on the positive electrode core. For the positive electrode core, a foil of a metal stable within a potential range of the positive electrode, such as aluminum, a film in which such a metal is disposed on a surface layer, and the like may be used. The positive electrode mixture layer includes a positive electrode active material, a binder, a conductive agent, and the like, for example. For example, the positive electrode mixture layer may be produced by: applying a positive electrode mixture shiny including the positive electrode active material, the conductive agent, the binder, and the like on the positive electrode core, and dried to form a coating film; and then compressing this coating film.

A void ratio of the positive electrode mixture layer is preferably less than or equal to 25 vol %, and more preferably less than or equal to 22 vol %. When the void ratio of the positive electrode mixture layer is less than or equal to 25 vol %, the effect of the present embodiment becomes more remarkable. A lower limit of the void ratio of the positive electrode mixture layer may be, for example, 16 vol %. The void ratio of the positive electrode mixture layer is calculated in accordance with the following formula from: a bulk density of the positive electrode mixture layer; and a true density and content rate of each component of the positive electrode active material, the conductive agent, the binder, and the like that are included in the positive electrode mixture layer (a mass proportion of each component in a total mass of the positive electrode mixture layer). Regulating a compression ratio of the positive electrode mixture layer may vary the bulk density of the positive electrode mixture layer, and thereby the void ratio of the positive electrode mixture layer may be varied.

$$\text{Void ratio of Positive Electrode Mixture Layer}=1-$$
$$(\text{Sum of (Content Rate/True Density) of Each}$$
$$\text{Component})\times\text{Bulk Density of Positive Electrode}$$
$$\text{Mixture Layer})$$

Examples of the conductive agent included in the positive electrode mixture layer include carbon-based particles of carbon black (CB), acetylene black (AB), Ketjenblack, graphite, and the like. These materials may be used singly, or in combinations of two or more thereof.

Examples of the binder included in the positive electrode mixture layer include fluorine-based resins such as polytetrafluoroethylene (PTFE) and polyvinylidene fluoride (PVdF), polyacrylonitrile (PAN), a polyimide resin, an acrylic resin, and a polyolefin resin. These binders may be used singly, or in combinations of two or more thereof.

The positive electrode active material included in the positive electrode mixture layer includes a lithium-transition metal composite oxide represented by the general formula $Li_aNi_bCo_cAl_dX_eO_f$, wherein $0.9 \leq a \leq 1.2$, $0.88 \leq b \leq 0.96$, $0 \leq c \leq 0.12$, $0 \leq d \leq 0.12$, $0 \leq e \leq 0.1$, $1.9 \leq f \leq 2.1$, $b+c+d=1$, and X represents at least one element selected from the group consisting of Mn, Mg, Ca, Sr, Ba, Ti, Zr, V, Nb, Ta, Mo, W, and B. The mole fractions of the metal elements contained in the lithium-transition metal composite oxide may be measured by, for example, inductively coupled high-frequency plasma atomic emission spectroscopy (ICP-AES). The positive electrode active material may include a lithium-transition metal composite oxide other than that represented by the above general formula or another compound within a range not impairing the object of the present disclosure.

"a", which represents a proportion of Li in the lithium-transition metal composite oxide, satisfies $0.9 \leq a \leq 1.2$, preferably satisfies $0.95 \leq \alpha \leq 1.05$. If "$\alpha$" is less than 0.9, the battery capacity may be decreased compared with the case where "$\alpha$" satisfies the above range. If "$\alpha$" is more than 1.2, the charge-discharge cycle characteristics may be deteriorated compared with the case where "$\alpha$" satisfies the above range.

"b", which represents a proportion of Ni in the total number of moles of the metal elements excluding Li and X in the lithium-transition metal composite oxide, satisfies $0.88 \leq b \leq 0.96$, and preferably satisfies $0.88 \leq b \leq 0.92$. Setting "b" to be greater than or equal to 0.88 may yield a battery with high capacity. Setting "a" to be less than or equal to 0.96 allows the other elements such as Co and Al to be included at an appropriate amount.

"c", which represents a proportion of Co in the total number of moles of the metal elements excluding Li and X in the lithium-transition metal composite oxide, satisfies $0 \leq c \leq 0.12$, and preferably satisfies $0.01 \leq c \leq 0.07$.

"d", which represents a proportion of Al in the total number of moles of the metal elements excluding Li and X in the lithium-transition metal composite oxide, satisfies $0 \leq d \leq 0.12$, and preferably satisfies $0.01 \leq c \leq 0.09$. Since an oxidation number of Al does not change during charge and discharge, containing Al in the transition metal layer is considered to stabilize the structure of the transition metal layer.

The lithium-transition metal composite oxide preferably contains Ni, Co, and Al. Using the Ni—Co—Al-based lithium-transition metal composite oxide may increase the battery capacity and inhibit cation mixing in which Ni enters Li sites.

"e", which represents a proportion of X (X represents at least one element selected from the group consisting of Mn, Mg, Ca, Sr, Ba, Ti, Zr, V, Nb, Ta, Mo, W, and B) in the lithium-transition metal composite oxide, preferably satisfies $0 \le e \le 0.1$, and more preferably satisfies $0.0001 \le e \le 0.01$.

The lithium-transition metal composite oxide is of secondary particles formed by aggregation of primary particles. An average volume particle diameter of the lithium-transition metal composite oxide is preferably greater than or equal to 3 μm and less than or equal to 30 μm, more preferably greater than or equal to 5 μm and less than or equal to 25 μm, and particularly preferably greater than or equal to 7 μm and less than or equal to 15 μm. The average volume particle diameter means a diameter (D50), which is also referred to as a median diameter, at which a cumulative frequency is 50% from a smaller particle diameter side in a particle size distribution on a volumetric basis. The particle size distribution of the secondary particles of the lithium-transition metal composite oxide may be measured by using a laser diffraction-type particle size distribution measuring device (for example, MT3000II, manufactured by MicrotracBEL Corp.) with water as a dispersion medium. A particle diameter of the primary particles constituting the secondary particles is, for example, greater than or equal to 0.05 μm and less than or equal to 1 μm. The particle diameter of the primary particles may be measured as a diameter of a circumscribed circle in a particle image observed with a scanning electron microscope (SEM).

X (X represents at least one element selected from the group consisting of Mn, Mg, Ca, Sr, Ba, Ti, Zr, V, Nb, Ta, Mo, W, and B) may adhere onto surfaces of the secondary particles or surfaces of the primary particles in the lithium-transition metal composite oxide. On the surfaces of the secondary particles or the surfaces of the primary particles, X may be present in a state of a compound containing X. A part of X may form a solid solution with the lithium-transition metal composite oxide.

The lithium-transition metal composite oxide has a volume of pores having a pore diameter of less than or equal to 0.3 μm, of greater than or equal to $6 \times 10^{-4}$ and less than or equal to $50 \times 10^{-4}$ mL/g. If the volume of pores is out of the range, at least one of the battery capacity and the cycle characteristics may not be achieved. The volume of pores may be measured by mercury porosimetry using a mercury porosimeter (for example, AutoPore IV9510 model, manufactured by Micromeritics Instrument Corporation). With the obtained pore distribution, volume of pores having a pore diameter of greater than or equal to 0 and less than or equal to 0.3 μm is integrated for calculation.

The lithium-transition metal composite oxide has a particle rupture strength at the average volume particle diameter, of greater than or equal to 120 MPa. If the particle rupture strength is less than 120 MPa, at least one of the battery capacity and the cycle characteristics may not be achieved. An upper limit of the particle rupture strength may be, for example, 300 MPa. The particle rupture strength may be calculated by using a micro compression tester (for example, MCT-211, manufactured by SHIMADZU CORPORATION). A force is applied to one lithium-transition metal composite oxide having the average volume particle diameter with a plane upper indenter with a tip of φ50 μm under a condition of a loading rate of 2.7 mN/sec to measure a breaking load at which the lithium-transition metal composite oxide is broken. Breaking loads are measured by the same method on 10 lithium-transition metal composite oxide having the average volume particle diameter, and an average value thereof is specified as the particle rupture strength.

Next, an example of a method for manufacturing the lithium-transition metal composite oxide will be described.

The method for manufacturing the positive electrode active material includes: a first step of obtaining a composite oxide including Ni and an optional metal element; and a second step of mixing the composite oxide obtained in the first step and another raw material, and calcining the mixture to obtain the lithium-transition metal composite oxide.

In the first step, with stirring a solution of metal salts including Ni and the optional metal element (such as Co and Al) a solution of an alkali such as sodium hydroxide is added dropwise for adjusting a pH on the alkaline side (for example, greater than or equal to 8.5 and less than or equal to 12.5) to precipitate (coprecipitate) a composite hydroxide including Ni and the optional metal element. Then, the composite hydroxide may be subjected to preliminary calcination to obtain a composite oxide including Ni and the optional metal element. In the preliminary calcination, a lower temperature and a shorter time tend to increase the volume of pores having a pore diameter of less than or equal to 0.3 μm.

In the second step, first, the composite oxide obtained in the first step, a Li raw material, and an X raw material are mixed to obtain a mixture. The mixing ratio between the composite oxide, the Li raw material, and the X raw material is appropriately decided so that each element in the finally obtained Li-transition metal oxide has a desired proportion. Examples of the Li raw material include $Li_2CO_3$, $LiOH$, $Li_2O_2$, $Li_2O$, $LiNO_3$, $LiNO_2$, $Li_2SO_4$, $LiOH \cdot H_2O$, $LiH$, and $LiF$. Examples of the X raw material include an oxide, hydroxide, sulfate salt, nitrate salt, and the like that include X. Then, the mixture may be subjected to main calcination under an oxygen atmosphere to obtain the lithium-transition metal composite oxide according to the present embodiment. In the main calcination, a higher temperature and a longer time tend to increase the particle rupture strength. Note that X may adhere to the lithium-transition metal composite oxide not mixed with the X raw material in the second step by a wet method or a dry method. The lithium-transition metal composite oxide powder obtained in the second step may be washed with water.

[Negative Electrode]

The negative electrode comprises: a negative electrode core such as, for example, a metal foil; and a negative electrode mixture layer formed on the negative electrode core. For the negative electrode core, a foil of a metal stable within a potential range of the negative electrode, such as copper, a film in which such a metal is disposed on a surface layer, and the like may be used. The negative electrode mixture layer includes a negative electrode active material, and in addition, preferably includes a thickener, a binder, and the like. For example, the negative electrode mixture layer may be produced by: applying a negative electrode mixture shiny including the negative electrode active material, the thickener, the binder, and the like on the negative electrode core, and dried to form a coating film; and then compressing this coating film.

For the negative electrode active material, a carbon material that may occlude and release lithium ions may be used, and in addition to graphite, hardly graphitizable carbon, easily graphitizable carbon, fibrous carbon, cokes, carbon black, and the like may be used. Furthermore, as a non-carbon-based material, silicon, tin, and an alloy or oxide mainly containing these elements may be used.

For the binder, PTFE, and the like may be used similar to that in the positive electrode, but styrene-butadiene copolymer (SBR), a modified derivative thereof, or the like may be used. For the thickener, carboxymethylcellulose (CMC) and the like may be used.

[Separator]

For the separator 13, a porous sheet and the like having an ion permeation property and an insulation property are used, for example. Specific examples of the porous sheet include a fine porous thin film, a woven fabric, and a nonwoven fabric. As a material for the separator, olefin resins such as polyethylene and polypropylene, cellulose, and the like are preferable. The separator 13 may be a laminate having a cellulose fibrous layer and a thermoplastic resin fibrous layer such as an olefin resin. The separator 13 may be a multilayer separator including a polyethylene layer and a polypropylene layer. On a surface of the separator 13, a material such as an aramid resin and a ceramic may be applied to use.

[Non-Aqueous Electrolyte]

The non-aqueous electrolyte includes a non-aqueous solvent and an electrolyte salt dissolved in the non-aqueous solvent. The electrolyte is not limited to a liquid electrolyte (electrolyte liquid), and may be a solid electrolyte using a gel polymer or the like. For the non-aqueous solvent, esters, ethers, nitriles such as acetonitrile, amides such as dimethylformamide, a mixed solvent of two or more thereof, and the like may be used, for example. The non-aqueous solvent may contain a halogen-substituted derivative in which hydrogen of these solvents are at least partially substituted with a halogen atom such as fluorine.

Examples of the above esters include cyclic carbonates such as ethylene carbonate (EC), propylene carbonate (PC), and butylene carbonate; chain carbonates such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylates such as γ-butyrolactone and γ-valerolactone; and chain carboxylates such as methyl acetate, ethyl acetate, propyl acetate, methyl propionate (MP), and ethyl propionate.

Examples of the above ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and a crown ether; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

For the halogen-substituted derivative, fluorinated cyclic carbonates such as fluoroethylene carbonate (FEC) fluorinated chain carbonates, fluorinated chain carboxylates such as methyl fluoropropionate (FMP), and the like are preferably used.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (1<x<6, n represents 1 or 2), $LiB_{10}Cl_{10}$, LiCl, LiBr, LiI, lithium chloroborane, a lithium lower aliphatic carboxylate, borate salts such as $Li_2B_4O_7$ and $Li(B(C_2O_4)F_2)$, and imide salts such as $LiN(SO_2CF_3)_2$ and $LiN(C_1F_{2l+1}SO_2)(C_mF_{2m+1}SO_2)$ {1 and m represent integers of greater than or equal to 1}. As the lithium salt, one of them may be used singly, and a plurality types thereof may be mixed to be used. Among them, $LiPF_6$ is preferably used from the viewpoints of ion conductivity, electrochemical stability, and the like. A concentration of the lithium salt is preferably greater than or equal to 0.8 mol and less than or equal to 1.8 mol per liter of the solvent.

EXAMPLES

Hereinafter, the present disclosure will be further described with Examples, but the present disclosure is not limited to these Examples.

Example 1

[Production of Positive Electrode Active Material]

A composite hydroxide obtained by a coprecipitation method and represented by $[Ni_{0.91}Co_{0.04}Al_{0.05}](OH)_2$ was subjected to preliminary calcination to obtain a composite oxide $(Ni_{0.91}Co_{0.04}Al_{0.05}O_2)$ (first step). Lithium hydroxide (LiOH) was mixed so that a molar ratio between a total amount of Ni, Co, and Al in the composite oxide and Li was 1:1.02. This mixture was subjected to main calcination under an oxygen atmosphere to obtain a positive electrode active material of Example 1 (second step). In the following Examples and Comparative Examples, temperatures of the preliminary calcination and main calcination are represented as relative evaluation of, in order of increasing the temperature, "+1", "0 (standard)", "–1", "–2", and "–3" based on the conditions of the preliminary calcination and main calcination in Example 1 being "0". Times of the preliminary calcination and main calcination are represented as relative evaluation of, in order of increasing the time, "+2", "+1", "0 (standard)", "–1", and "–2" based on the conditions of the preliminary calcination and main calcination in Example 1 being "0".

The composition of the positive electrode active material of Example 1 was analyzed with an ICP atomic emission spectrometer (product name "iCAP6300", manufactured by Thermo Fisher Scientific K.K.), and found to be $LiNi_{0.91}Co_{0.04}Al_{0.05}O_2$. The positive electrode active material of Example 1 was of secondary particles having an average volume particle diameter of 11 μm, a volume of pores having a pore diameter of less than or equal to 0.3 μm, of $33\times10^{-4}$ mL/g, and a particle rupture strength at the average volume particle diameter of 120 MPa.

[Production of Positive Electrode]

Mixing 100 parts by mass of the positive electrode active material, 1 part by mass of acetylene black (AB) as a conductive agent, and 0.9 parts by mass of polyvinylidene fluoride (PVdF) as a binder was performed, and an appropriate amount of N-methyl-2-pyrrolidone (NMP) was added to prepare a positive electrode mixture slurry. Then, this positive electrode mixture shiny was applied on both surfaces of a positive electrode core made of aluminum foil, the coating film was dried, and then the coating film was compressed by using a roller so that a void ratio of the positive electrode mixture layer was 25%. Thereafter, the resultant was cut to a predetermined electrode size to obtain a positive electrode in which positive electrode mixture layers were formed on both the surfaces of the positive electrode core. On a part of the positive electrode, an exposed portion where the surface of the positive electrode core was exposed was provided.

[Production of Negative Electrode]

Mixing 90 parts by mass of a graphite powder as a negative electrode active material, 5 parts by mass of silicon oxide, 3 parts by mass of carboxymethylcellulose (CMC) as a thickener, and 2 parts by mass of styrene-butadiene rubber (SBR) as a binder was performed, and an appropriate amount of water was added to prepare a negative electrode mixture shiny. This negative electrode mixture slurry was applied on both surfaces of a negative electrode core made of copper foil, the coating film was dried, then the coating film was compressed by using a roller, and cut to a predetermined electrode size to obtain a negative electrode in which negative electrode mixture layers were formed on both the surfaces of the negative electrode core. On a part of the negative electrode, an exposed portion where the surface of the negative electrode core was exposed was provided.

[Preparation of Non-Aqueous Electrolyte]

Ethylene carbonate (EC) and ethyl methyl carbonate (EMC) were mixed at a volume ratio of 30:70. Into this mixed solvent, lithium hexafluorophosphate ($LiPF_6$) was added so that a concentration was 1 mol/liter to prepare a non-aqueous electrolyte.

[Production of Battery]

An aluminum lead was attached to the exposed portion of the positive electrode, a nickel lead was attached to the exposed portion of the negative electrode, the positive electrode and the negative electrode were spirally wound with a fine porous thin film separator made of polyethylene interposed therebetween to produce a wound electrode assembly. This electrode assembly was housed in a cylindrical exterior with $\phi$21 mm and 70 mm in height, the above non-aqueous electrolyte was injected thereinto, and then an opening of the exterior was sealed with a sealing assembly to produce a cylindrical battery.

[Evaluation of Specific Capacity of Positive Electrode Active Material]

Under a temperature environment at 25° C., the above battery was charged at a constant current of 0.3 C until a battery voltage reached 4.2 V, and charged at a constant voltage of 4.2 V until a current value reached 0.02 C. Thereafter, the battery was discharged at a constant current of 0.3 C until the battery voltage reached 2.5 V, and discharged at a constant current of 0.02 C until the battery voltage reached 2.5 V. This charge-discharge cycle was performed two times. A discharge capacity at the 2nd cycle was divided by a mass of the positive electrode active material to be specified as a specific capacity of the positive electrode active material.

[Evaluation of Capacity Maintenance Rate]

On the above battery, the following cycle test was performed. A discharge capacity at the 1st cycle and a discharge capacity at the 300th cycle of the cycle test were determined to calculate a capacity maintenance rate with the following formula.

Capacity Maintenance Rate (%)=(Discharge Capacity at 300th Cycle/Discharge Capacity at 1st Cycle)×100

<Cycle Test>

Under a temperature environment at 25° C., the battery was charged at a constant current of 0.3 C until a battery voltage reached 4.2 V, and charged at a constant voltage of 4.2 V until a current value reached 0.02 C. Then, the battery was discharged at a constant current of 0.3 C until the battery voltage reached 2.5 V. This charge-discharge cycle was repeated 300 times.

Examples 2 to 5 and Comparative Examples 1 to 8

Batteries were produced and evaluated in the same manner as in Example 1 except that: the conditions (temperature and time) of the preliminary calcination and the main calcination were changed to conditions shown in Table 1 in the production of the positive electrode active material; and the void ratio of the positive electrode mixture layer was changed to values shown in Table 1 in the production of positive electrode. In any of Examples 2 to 5 and Comparative Examples 1 to 8, the average volume particle diameters of the positive electrode active materials were 11 μm, same as of Example 1. The compositions of the positive electrode active material of Examples 2 to 5 and Comparative Examples 1 to 8 were analyzed with the ICP atomic emission spectrometer and found to be $LiNi_{0.91}Co_{0.04}Al_{0.05}O_2$, same as of Example 1.

Table 1 shows the evaluation results of each battery of Examples 1 to 5 and Comparative Examples 1 to 8. In Table 1, the results of Examples and Comparative Examples are shown as values relative to the specific capacity of the positive electrode active material and the capacity maintenance rate of the battery of Comparative Example 1 being 100. Table 1 shows the conditions of the above preliminary calcination and main calcination, and the void ratio of the positive electrode mixture layer, and in addition, the volume of pores having a pore diameter of less than or equal to 0.3 μm and the particle rupture strength at the average volume particle diameter.

TABLE 1

| | Positive electrode active material | | | | | | Positive | Evaluation results | |
|---|---|---|---|---|---|---|---|---|---|
| | Preliminary calcination condition | | Main calcination condition | | Volume of pores | Particle rupture strength | electrode mixture layer Void ratio | Specific capacity of positive electrode active | Capacity maintenance |
| | Temp. | Time | Temp. | Time | (mL/g) | (MPa) | (%) | material | rate |
| Example 1 | 0 | 0 | 0 | 0 | $33 \times 10^{-4}$ | 120 | 25 | 102 | 110 |
| Example 2 | 0 | 0 | 0 | 0 | $33 \times 10^{-4}$ | 120 | 22 | 110 | 112 |
| Example 3 | 0 | 0 | +1 | +1 | $33 \times 10^{-4}$ | 190 | 25 | 102 | 110 |
| Example 4 | −1 | −1 | 0 | 0 | $50 \times 10^{-4}$ | 120 | 25 | 102 | 108 |
| Example 5 | +1 | +1 | 0 | 0 | $6 \times 10^{-4}$ | 120 | 25 | 102 | 110 |
| Comparative Example 1 | −2 | −1 | −1 | 0 | $59 \times 10^{-4}$ | 80 | 25 | 100 | 100 |

TABLE 1-continued

| | Positive electrode active material | | | | | Positive | Evaluation results | |
| | Preliminary calcination condition | | Main calcination condition | | Volume of pores | Particle rupture strength | electrode mixture layer Void ratio | Specific capacity of positive electrode active | Capacity maintenance |
| | Temp. | Time | Temp. | Time | (mL/g) | (MPa) | (%) | material | rate |
|---|---|---|---|---|---|---|---|---|---|
| Comparative Example 2 | −2 | −1 | −1 | 0 | $59 \times 10^{-4}$ | 80 | 22 | 93 | 101 |
| Comparative Example 3 | −3 | −2 | −1 | 0 | $81 \times 10^{-4}$ | 80 | 25 | 100 | 90 |
| Comparative Example 4 | −2 | −1 | 0 | 0 | $59 \times 10^{-4}$ | 120 | 25 | 101 | 90 |
| Comparative Example 5 | −2 | −1 | 0 | 0 | $59 \times 10^{-4}$ | 120 | 22 | 102 | 85 |
| Comparative Example 6 | +2 | +2 | 0 | 0 | $1.9 \times 10^{-4}$ | 120 | 25 | 93 | 90 |
| Comparative Example 7 | 0 | 0 | −1 | 0 | $33 \times 10^{-4}$ | 80 | 25 | 94 | 102 |
| Comparative Example 8 | 0 | 0 | −1 | 0 | $33 \times 10^{-4}$ | 80 | 22 | 90 | 103 |

From the results of Examples 1 to 5, it is found that using the positive electrode active material having a volume of pores having a pore diameter of less than or equal to 0.3 μm, of greater than or equal to $6 \times 10^{-4}$ and less than or equal to $50 \times 10^{-4}$ mL/g and having a particle rupture strength at the average volume particle diameter, of greater than or equal to 120 MPa may yield the battery that achieves both of the battery capacity and the cycle characteristics. Meanwhile, the batteries of Comparative Examples 1 to 8, which did not satisfy the above condition, failed to achieve at least one of the battery capacity and the cycle characteristics.

Example 6

A battery was produced and evaluated in the same manner as in Example 1 except that, in the second step of the production of the positive electrode active material, the composite oxide and $Ca(OH)_2$ were mixed so that a content of Ca was 0.2 mol % based on the total amount of Ni, Co, and Al in the composite oxide, and lithium hydroxide (LiOH) was mixed so that a molar ratio between a total amount of Ni, Co, Al, and Ca, and Li was 1:1.02. The average volume particle diameter of the positive electrode active material was 11 μm, same as of Example 1. The composition of the positive electrode active material was analyzed with the ICP atomic emission spectrometer and found to be $LiNi_{0.91}Co_{0.04}Al_{0.05}Ca_{0.002}O_2$. From results of observation with a transmission electron microscope (TEM), it was confirmed that Ca adhered onto the surfaces of the secondary particles or primary particles of the positive electrode active material.

Examples 7 to 10

Batteries were produced and evaluated in the same manner as in Example 6 except that, in the second step of the production of the positive electrode active material, each of $TiO_2$, $WO_3$, $Nb_2O_5$, and $B_2O_3$ was mixed instead of $Ca(OH)_2$ so that a content of each of Ti, W, Nb, and B was 0.2 mol %. In any of Examples 7 to 10, the average volume particle diameters of the positive electrode active materials were 11 μm, same as of Example 6. The compositions of the positive electrode active materials of the Examples 7 to 10 were analyzed with the ICP atomic emission spectrometer and found to be $LiNi_{0.91}Co_{0.04}Al_{0.05}Ti_{0.002}O_2$, $LiNi_{0.91}Co_{0.04}Al_{0.05}W_{0.002}O_2$, $LiNi_{0.91}Co_{0.04}Al_{0.05}Nb_{0.002}O_2$, and $LiNi_{0.91}Co_{0.04}Al_{0.05}B_{0.002}O_2$, respectively. From results of SEM observation, it was confirmed that each of Ti, W, Nb, and B adhered onto the surfaces of the secondary particles or primary particles of the positive electrode active material of Examples 7 to 10.

Comparative Example 9

A battery was produced and evaluated in the same manner as in Comparative Example 1 except that, in the second step of the production of the positive electrode active material, the composite oxide and $Ca(OH)_2$ were mixed so that a content of Ca was 0.2 mol % based on the total amount of Ni, Co, and Al in the composite oxide, and lithium hydroxide (LiOH) was mixed so that a molar ratio between a total amount of Ni, Co, Al, and Ca, and Li was 1:1.02. The average volume particle diameter of the positive electrode active material was 11 μm, same as of Comparative Example 1. The composition of the positive electrode active material was analyzed with the ICP atomic emission spectrometer and found to be $LiNi_{0.91}Co_{0.04}Al_{0.05}Ca_{0.002}O_2$, same as of Example 6. From results of SEM observation, it was confirmed that Ca adhered onto the surfaces of the secondary particles or primary particles of the positive electrode active material.

Comparative Examples 10 to 13

Batteries were produced and evaluated in the same manner as in Comparative Example 9 except that, in the second step of the production of the positive electrode active material, each of $TiO_2$, $WO_3$, $Nb_2O_5$, and $B_2O_3$ was mixed instead of $Ca(OH)_2$ so that a content of each of Ti, W, Nb, and B was 0.2 mol %. In any of Comparative Examples 10 to 13, the average volume particle diameters of the positive electrode active materials were 11 μm, same as of Comparative Example 9. The compositions of the positive electrode active materials of Comparative Examples 10 to 13 were analyzed with the ICP atomic emission spectrometer and found to be $LiNi_{0.91}Co_{0.04}Al_{0.05}Ti_{0.002}O_2$, $LiNi_{0.91}Co_{0.04}Al_{0.05}W_{0.002}O_2$, $LiNi_{0.91}Co_{0.04}Al_{0.05}Nb_{0.002}O_2$, and $LiNi_{0.91}Co_{0.04}Al_{0.05}B_{0.002}O_2$, same as of Examples 7 to 10, respectively. From results of SEM observation, it was confirmed that each of Ti, W, Nb, and B adhered onto the surfaces of the secondary particles or primary particles of the positive electrode active material of Comparative Examples 10 to 13.

Table 2 shows the evaluation results of each of the batteries of Examples 6 to 10 and Comparative Examples 9 to 13, and for comparison, shows the evaluation results of Example 1 and Comparative Example 1. In Table 1, the results of Examples 6 to 10 are shown as values relative to the specific capacity of the positive electrode active material and the capacity maintenance rate of each of the batteries of Comparative Examples 9 to 13, which includes the same X, being 100. Table 2 also shows the volume of pores having a pore diameter of less than or equal to 0.3 μm, the particle rupture strength at the average volume particle diameter, and the void ratio of the positive electrode mixture layer.

The invention claimed is:

1. A positive electrode active material for a non-aqueous electrolyte secondary battery, including a lithium-transition metal composite oxide represented by the general formula $Li_aNi_bCo_cAl_dX_eO_f$, wherein $0.9 \leq a \leq 1.2$, $0.88 \leq b \leq 0.96$, $0 \leq c \leq 0.12$, $0 \leq d \leq 0.12$, $0 \leq e \leq 0.1$, $1.9 \leq f \leq 2.1$, $b+c+d=1$, and X represents at least one element selected from the group consisting of Mn, Mg, Ca, Sr, Ba, Ti, Zr, V, Nb, Ta, Mo, W, and B, wherein the lithium-transition metal composite oxide includes secondary particles formed by aggregation of primary particles, and has a volume of pores having a pore diameter of less than or equal to 0.3 μm, of greater than or equal to $6 \times 10^{-4}$ and less than or equal to $50 \times 10^{-4}$ mL/g, and a particle rupture strength at an average volume particle diameter, of greater than or equal to 120 MPa.

TABLE 2

| | | Positive electrode active material | | Positive electrode mixture layer | Evaluation results | |
| | | | | | Specific capacity | |
| | X | Volume of pores (mL/g) | Particle rupture strength (MPa) | Void ratio (%) | of positive electrode active material | Capacity maintenance rate |
| --- | --- | --- | --- | --- | --- | --- |
| Example 1 | — | $33 \times 10^{-4}$ | 120 | 25 | 102 | 110 |
| Example 6 | Ca | $33 \times 10^{-4}$ | 120 | 25 | 110 | 135 |
| Example 7 | Ti | $33 \times 10^{-4}$ | 190 | 25 | 110 | 125 |
| Example 8 | W | $33 \times 10^{-4}$ | 120 | 25 | 115 | 126 |
| Example 9 | Nb | $33 \times 10^{-4}$ | 120 | 25 | 120 | 138 |
| Example 10 | B | $33 \times 10^{-4}$ | 120 | 25 | 120 | 123 |
| Comparative Example 1 | — | $59 \times 10^{-4}$ | 80 | 25 | 100 | 100 |
| Comparative Example 9 | Ca | $59 \times 10^{-4}$ | 80 | 25 | 100 | 100 |
| Comparative Example 10 | Ti | $59 \times 10^{-4}$ | 80 | 25 | 100 | 100 |
| Comparative Example 11 | W | $59 \times 10^{-4}$ | 80 | 25 | 100 | 100 |
| Comparative Example 12 | Nb | $59 \times 10^{-4}$ | 80 | 25 | 100 | 100 |
| Comparative Example 13 | B | $59 \times 10^{-4}$ | 80 | 25 | 100 | 100 |

The positive electrode active materials of Examples 6 to 10 in which X (Ca, Ti, W, Nb, or B) adheres onto the surface may remarkably improve the specific capacity of the positive electrode active material and the capacity maintenance rate compared with the corresponding positive electrode active materials of Comparative Examples 9 to 13. Meanwhile, Example 1 in which X does not adhere onto the surface may improve the specific capacity and the capacity maintenance rate of the positive electrode active material compared with Comparative Example 1, but the improvement rate is lower than that of Examples 6 to 10. Therefore, it is found that the positive electrode active material with X adhered onto the surface may enhance the effect of the present embodiment compared with the positive electrode active material with X adhered onto the surface.

REFERENCE SIGNS LIST

10 Secondary battery, 11 Positive electrode, 12 Negative electrode, 13 Separator, 14 Electrode assembly, 15 Exterior, 16 Sealing assembly, 17, 18 Insulating plate, 19 Positive electrode lead, 20 Negative electrode lead, 21 Groove, 22 Filter, 23 Lower vent member, 24 Insulating member, 25 Upper vent member, 26 Cap, 26a Opening, 27 Gasket 2. The positive electrode active material for a non-aqueous electrolyte secondary battery according to claim 1, wherein the X adheres onto surfaces of the secondary particles or surfaces of the primary particles.

3. A non-aqueous electrolyte secondary battery, comprising:

a positive electrode including the positive electrode active material for a non-aqueous electrolyte secondary battery according to claim 1;

a negative electrode; and a non-aqueous electrolyte.

4. The non-aqueous electrolyte secondary battery according to claim 3, wherein the positive electrode has a positive electrode core and a positive electrode mixture layer formed on a surface of the positive electrode core, and a void ratio of the positive electrode mixture layer is less than or equal to 25 vol %.

5. The non-aqueous electrolyte secondary battery according to claim 4, wherein the void ratio of the positive electrode mixture layer is less than or equal to 22 vol %.

6. The positive electrode active material for a non-aqueous electrolyte secondary battery according to claim 1, wherein a particle diameter of the primary particles constituting the secondary particles is greater than or equal to 0.05 μm and less than or equal to 1 μm.

7. The positive electrode active material for a non-aqueous electrolyte secondary battery according to claim 1, wherein X represents at least one element selected from the group consisting of Ca, Ti, Nb, W, and B, and X adheres onto surfaces of the secondary particles.

* * * * *